United States Patent Office 3,813,261
Patented May 28, 1974

3,813,261
TRANSPARENTIZED FIBROUS MATERIALS AND PROCESS FOR MAKING SAME
Peter Muller, Port Washington, N.Y., assignor to Andrews Paper & Chemical Co., Inc., Port Washington, N.Y.
No Drawing. Filed July 23, 1971, Ser. No. 165,692
Int. Cl. D21h 5/08
U.S. Cl. 117—153
4 Claims

ABSTRACT OF THE DISCLOSURE

A transparentized fibrous material and process for its preparation is disclosed. A fibrous material is treated with an impregnating liquid containing a polyol having two or more hydroxyl functions part or all of which are etherified or esterified with radicals containing one or more ether or ester links and free hydroxyl groups, and also containing methylol derivatives of a polyamino compound together with a condensation catalyst. The impregnated fibrous material is cured by resination reaction *in situ* and immobilization of the impregnated material. A transparentized fibrous material results which is resistant to water, most organic solvents, and heat and is useful for use as tracing materials as well as a translucent base for sensitizing with reprographic coatings.

BACKGROUND OF THE INVENTION

Transparent papers are widely used in the packaging, printing, and engineering field. The purposes for using transparentized paper vary from reduced visual and reprint opacity to chemical and physical resistance.

Engineering and reproduction applications for transparentized papers require certain physical and chemical characteristics such as good pencil and ink receptivity for tracing media, and a receptivity combined with resistance which overcomes uneven penetration of coating solutions used in reprographic papers. When these papers are used in drafting, visual brightness is required and high UV translucency is necessary for making good reproductions. In practice, each grade of transparentized paper serves only a particular application. These papers are not interchangeable with each particular application. It is also necessary that a transparentized paper has good physcial strength to resist handling, good permanence for record keeping, and is chemically stable. Components applied to render the paper transparent shall not migrate or volatilize which would result in the loss of transparency and contamination of interfiled documents.

Paper is a fibrous material with many voids between fibers which scatter incident light. The physical process of rendering paper transparent consists of filling the voids between the fibers with a material that has a refractive index identical or very close to that of the paper fibers. It should be noted that mineral fillers in papers affect the transparency because of their light absorption and light scattering properties and that papers without mineral fillers are preferred for transparentizing use.

Transparentizing paper is a widely established art and has been accomplished by impregnating the paper with mineral oils or waxes or polymeric thermoplastic resins, such as polystyrenes, polybutenes, polypropenes, various rosin derivatives, or various polymers or copolymers of acrylics and styrene, with or without plasticizers. The application of such materials to the paper is done by either hot melt applications or by applying organic solvent solutions or aqueous emulsions to the paper. The processing equipment used for applying or treating fibrous material such as paper, varies with the type of application employed. For example, the transparentizing mixture may be applied by extrusion, tub, roller applications and excess material may be removed by a doctoring off process using scrapers, wire, squeeze rollers, or size press. Where paper is employed for transparentizing, it sometimes is "wet packed" after treatment to improve the distribution of the transparentizing agents in the body of the paper and then after a certain time the "wet packed" paper is passed through a dryer to remove the solvent vehicle.

Where the transparentized paper is to be employed for drafting use, the transparentized treatment is followed by a surface application with resins and toothing agents such as particles of silica which are harder than graphite.

There are many disadvantages and problems associated with the prior art processes for transparentizing fibrous materials. High molecular weight resins would be desirable for transparentizing fibrous materials because of their physical strength, heat and water resistance, and absence of tendency of the resin to migrate within or out of the finished fibrous material. Such resins, however, can be applied to the fibrous material only with great difficulty since they tend to accumulate near or adjacent the surface of the fibrous material and when impregnation is accomplished the resin is generally unevenly distributed throughout the fibrous material. Thus, the transluency of the product made therefrom is low and is not uniform.

Low molecular weight liquid resins of low viscosity or mineral oils readily penetrate the fibrous material and produce a material of high translucency, but the finished surface would be soft and would not be pencil resistant. The surface would ghost upon erasure. Also, the transparentizing agents tend to migrate from the paper to interfiled documents lying adjacent thereto. Further, such low molecular weight resins or low viscosity materials are volatile and cannot be used where the transparentizing fibrous material is subjected to elevated temperature processing equipment, such as xerography machines The surface of such transparentized materials are often tacky to the touch and therefore are undesirable.

Polymeric transparentizing agents which contain polaric and non-polaric groups in the chain are wetting agents and, thus, will distribute more readily through the fibrous material but form a transparentized fibrous material which is too soft to the touch. Further, the transparentizing agent is mobile and easily leached out by water. It is not set in the fibrous material and would not be suitable for the application of a diazo-sensitizing solution which is coated on the transparentized material because such coating would deeply penetrate it.

The transparentizing process is generally carried out off the paper-machine as a converting operation. Since the transparentizing materials generally contain organic solvents which are generally highly volatile aromatic liquids, the solvent vapors present pollution problems, not only to the atmosphere, but also in the area where the evaporation is taking place.

Many transparentized papers discolor when exposed to UV light and this affects the reprint speed.

Transparentized papers often produce excessive curl when coated with diazotype sensitizing solution. Such curl is objectionable when the treated paper is used.

It is an object of the invention to overcome the disadvantages of conventionally transparentized fibrous materials by providing an improved transparentized fibrous material with a high visual and UV translucency, with improved tracing surfaces for good receptivity and erasability of pencil and ink lines, and with an improved resistance against discoloration when exposed to UV light.

Another object of the invention is to provide a transparentized paper of good permanence which is resistant to water, and to common chemical solvents, and which is stable to elevated temperatures when being used in xerography machines.

Still another object of the invention is to provide a transparentized paper which is adapted for use in a variety of applications such as a base for diazo reproduction coatings, a tracing sheet, or a copying sheet in xerography machines.

A further object of the invention is to provide a process for transparentizing fibrous material which can be performed without the need of a solvent and thereby avoid any pollution problems attendant therewith.

A further object of the invention is to provide a transparentized fibrous material useful as a diazotype intermediate which can be processed on conventional printing equipment without an objectional curl to the fibrous material.

SUMMARY OF THE INVENTION

My invention generally contemplates providing a novel composition which is particularly adapted for use in transparentizing fibrous material. I have found that polyols having two or more hydroxyl functions, part of all of which are etherified or esterified with radicals containing one or more ether or ester links and free hydroxyl groups, readily penetrate into a fibrous material and render the material highly translucent. I have also found that hydroxyethers of polyols or hydroxyesters-esters of polyols are generally soluble in water or a water-alcohol mixture or in alcohol, and that these compositions are readily mixed with alkylated N methylol derivatives of di or polyamines, for example melamine derivatives or urea formaldehyde resins of low molecular weight; and that such mixtures in solution with the addition of an effective amount of a condensation catalyst are stable for all practical purposes; and that such composition when applied to a fibrous material such as paper, readily penetrates into the body of the paper and distributes homogeneously therethrough; and that after removal of the solvent a resination reaction takes place, which is accelerated and advanced through exposure to elevated temperatures. The resination reaction conditions are not critical and, similar to general resin curing reaction, extended times are necessary at lower temperatures and shorter times are required at higher temperatures. The resulting treated fibrous material is highly translucent, is waterfast, is resistant to most common organic solvents and is stable at elevated temperatures. Also the transparentized fibrous material is found to have excellent receptivity and erasability characteristics for soft and hard pencils and ink; it is receptive to, but prevents penetration of diazotype precoat and sensitizing preparations in aqueous or solvent systems. The transparentized fibrous material is suitable for use to prepare translucent copies in xerography machines. Because of the chemical inertia of the transparentized fibrous material, it lends itself to subcoating with release layers and overcoating with a diazotype layer from which after printing and developing in the conventional manner, lines can be easily removed by a mechanical eraser without destroying the fibrous base material.

The components of the transparentizing composition of the invention herein are readily available in commerce, and are inexpensive industrial organic chemicals. For example, the polyol hydroxyethers and esters are available in wide variety of compositions, as they have found wide application in polyurethane chemistry for the manufacture of foam rubber and lacquer resins. Also, certain polyol derivatives which have phosphate-ester groups as a part of the molecule are applicable and useful in the present invention and this type of polyol has flame retardent characteristics and renders the transparentized fibrous material less combustible.

The methylol derivatives used in forming the transparentizing composition of the present invention have found use in the plastics field and in wet-strength resins for the paper industry.

The process for transparentizing fibrous material of the invention herein, can be applied to most types of paper base, such as water leaf paper, without any or with a very low proportion of internal sizing, or internally and surface sized paper. When applying the transparentizing composition to water leaf paper, the composition penetrates almost instantly into the paper and drying and curing may be carried out on a machine during the same pass before rewinding. Where "harder" sized paper is used as the base paper stock for the transparentizing process, the transparentizing composition does not instantly penetrate the paper stock and it is therefore preferable to "wet pack" the paper stock for a period of time, for example, from a very few minutes to as long as twenty-four hours or more, depending upon the degree of sizing applied to the paper; then the impregnated paper which is transparentized can be passed through the dryer to remove the solvent vehicle and to complete the resin condensation reaction. The process of this invention can be practiced at the paper mill, in paper converting plants on conventional paper coating machines, or by paper saturating, or size press equipment.

It has been found that translucency of the transparentized fibrous material may be increased by subjecting the treated transparentized fibrous material to a calendering operation.

In practicing the invention herein, it has been found that the physical resistance of the finished transparentized fibrous material during handling and usage thereof may be further improved and ghosting from folding further decreased, if after the impregnation of the transparentizing composition, the water or solvents are removed by drying at moderate temperatures before the curing action of the resin components of the composition has begun. It is believed that the reason for such further improvement found in transparentizing fibrous materials with the improved transparentizing composition, is the tight packing which results between the shrunken fibers through dehydration of the fibers. Thus, exposure to a very low dry atmosphere of the cured transparentized fibrous material causes minimal additional shrinkage between the fibers and resin. Where the transparentized fibrous material is subjected to high humidity, the fibers absorb the water and swell, thus tightening the packing between the resin and the fibers and further increasing the strength of the transparentized fibrous material.

In the course of my invention, I have further found that while extended treatment with water does not seem to alter the qualities of the transparentized sheet after redrying, the water-wetted sheet exhibits a further increase of translucency for visual light and the ultraviolet light of the printing machine; and as the water evaporates, the translucency returns to the same degree of translucency as it originally exhibited prior to its water treatment.

This phenomenon is contrary to conventionally transparentized papers which when wetted out with water do not gain but often lose translucency and upon redrying sometimes permanently decrease their degree of translucency in relation to the translucency exhibited prior to their water treatment.

The temporary transparency increase through water wetting can be useful in certain practical applications which require a localized and/or temporary increased transparency.

In practicing the process of the invention herein, it may be desirous to include in the transparentizing process other components which add specific physical characteristics to the transparentized fibrous material, for example, antistatic compounds, compounds which effect the specified degree of gloss, compounds which add adhesiveness qualities, or repellent qualities. These characteristics may be incorporated in the transparentizing composition prior to impregnation of the fibrous material or may be coated on the surfaces of the transparentized fibrous material as a subsequent step.

The following typical compounds and examples will aid in a greater understanding of the invention herein, and will set forth a more detailed description of the invention. However, it should be understood that numerous variations and changes may be made without departing from the spirit and scope of the invention herein.

Typical polyol derivatives applicable to this invention are compounds of the following general structure:

A. Polyoxy propylene ethers of propylene glycol:

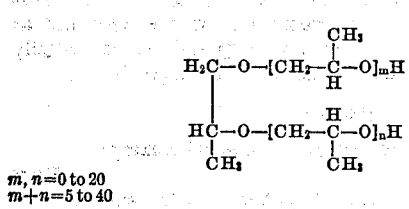

$m, n = 0$ to $20$
$m+n = 5$ to $40$

B. Polyoxy propylene ethers of trimethylol propane:

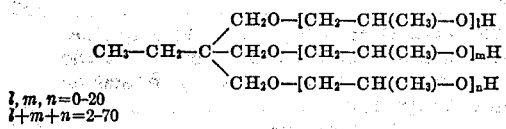

$l, m, n = 0-20$
$l+m+n = 2-70$

C. Polyoxy propylene ethers of glycerine:

$CH_2-O-[CH_2-CH(CH_3)-O]_lH$    $l,m,n=0-20$
$CH-O-[CH_2-CH(CH_3)-O]_mH$    $l+m+n=2-50$
$CH_2-O-[CH_2-CH(CH_3)-O]_nH$

D. Polyoxy propylene of pentaerythritol:

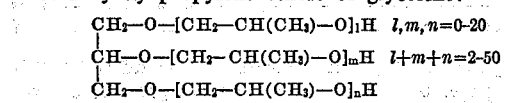

E. Polyoxy propylene ethers of sorbitol:

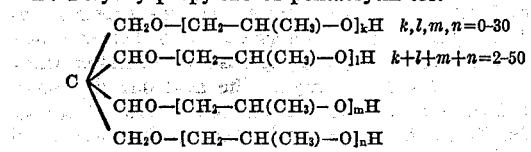

F. Polyoxy propylene ether of sucrose:

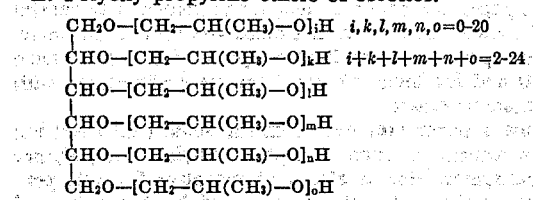

$h, i, k, l, m, n, o, p = 0-20$
$h+i+k+l+m+n+o+p = 2-40$

G. Polyoxy propylene ether of methylglucoside:

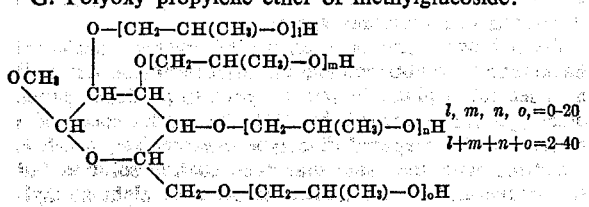

$l, m, n, o, = 0-20$
$l+m+n+o = 2-40$

H. Useful compounds of the compositions A through F are manufactured and sold under the trade names of pluracols by Wyandotte Chemical Corporation.

Phosphorus containing polyether polyols performing very well within the present invention are sold by the same manufacturer under the trade name of Pluracol 208, -251, -327, -347, -383, -455, and -480. Besides the transparentizing effect, they convey self fire extinguishing properties to the transparentized paper. Compounds of composition G are manufactured and sold by I.C.P. International under the name of Cord Polyether MEG 300.

I. Linear and branched polyols, such as sold by Farbenfabriken Bayer AG under the trade names of Desmophen 1600, -550 U, and -1900 U.

J. Polyester polyols, such as sold by Farbenfabriken Bayer AG under the trade name of Desmophen 850.

K. Ether and ester groups containing branched polyols, such as sold by Farbenfabriken Bayer AG under the trade name of Desmophen 1150.

L. Mixtures of any two or more of the named polyols (A) through (L) are applicable within the scope of this invention. The polyol derivatives (A) through (L) are industrially obtained through poly condensation reactions and are identified in general by their OH numer (mg./g. KOH) and average molecular weight.

M. Compounds as per (A) through (G) in which the polyoxy propylene groups are replaced by polyoxy ethylene groups.

N. Typical N-methylol amine derivatives useful in the invention are the following:

1. Hexamethoxymethyl-melamine, such as sold under the trade name Cymel 300 and -301 by American Cyanamid Company.
2. Soluble low polymers of methylol-melamine with between 1 to 6 methylol groups per melamine group.
3. Alkylated methylol-melamines with between 1 to 6 methylol groups per melamine molecule.

As catalysts for the condensation reaction, various acidic materials can be used, such as:

1. p-Toluene-sulfonic acid or its salts with volatile bases.
2. Sulfuric acid or its acid salts.
3. Commercially available acidic catalysts, such as sold under the trade name of Catalyst 1010 by American Cyanamid Company.

While the transparentizing process of this invention can be performed by directly applying a mixture of the reacting components to the paper, it is often more practical to dilute the mixture of the reacting components with a volatile solvent, which is generally water or a mixture of water and ethanol or other alcohols; or ethylene dichloride if an anhydrous system is preferred, or any organic solvent with sufficient polaric character to be a solvent for the mixture of the reacting components.

In the chemical reaction of resination taking place between the hydroxyl groups of the polyol and the methylol groups of the amine compounds, with the polyols disposing of between about two to eight reactive hydroxyl groups per molecule; with the N-methylol derivatives disposing of between about two to six reactive methylol groups per molecule; and with all or part of these groups potentially entering into reaction, it is obvious that the applicable limits between ratios of the reaction partners is limited between the reaction of one hydroxyl group of the polyol with one methylol group of the amine and the reaction of all hydroxyl groups of the polyol and all methylol groups of the amine. I have obtained best results with ratios of hydroxyl groups of the polyol derivative to the methylol or alkylated methylol groups of the polyamines of from about 3:2 and 3:8 respectively.

The acidic catalyst for the resination reaction is added in an effective concentration. Generally in practicing the invention herein effective concentrations are between about 1% and 10% based on the weight of the reacting components.

Example No. 1

A solution is prepared by mechanical mixing of:

| | Parts |
|---|---|
| Polyoxypropylene ether of Sorbitol with an OH number of 525 and an average molecular weight of 675 | 600 |
| Hexamethyl-methylol melamine | 250 |
| Ethanol | 400 |
| Water | 400 |
| p-Toluene sulfonic acid | 15 |

On a paper coating machine, a natural 100% rag paper with a basis weight of 45 g./m.$^2$ with rosin internal and starch surface sizing is dipped into the above solution and immediately thereafter passed through a pair of squeeze rollers, which eliminate excess solution from the surface. The paper is then wound up without drying and kept wet packed overnight. The next morning the paper is unwound, passed through a dryer where it is exposed to a temperature of 300° F. for a period of 15 seconds, and then rewound.

The paper thus obtained has increased its basis weight to 55 g./m.$^2$. It is highly and evenly translucent to visible light and to the light of a mercury lamp. Its hard surface is receptive to tracing pencils of the range from No. 2 through No. 8H and to India ink. It easily erases with a bare minimum of "ghosting." When used as a tracing for making reprints of a diazotype paper, the printing speed is 85% faster than the printing speed that can be used if the tracing is prepared on the original non-transparentized base. When dipped into water, acetone, alcohol, ethylacetate, and redried, no change in translucency is apparent.

The sheet as obtained in this example is used to prepare an intermediate diazotype reproduction paper through precoating and sensitizing or direct sensitizing, as described in U.S. Pats. Nos. 2,516,931; 2,940,852; and 3,330,662. A high-quality intermediate diazotype without objectionable curl and with good line reproducibility and high reprint translucency is obtained. The reprint speed of this paper is 20% faster than of a diazotype intermediate, of which the base is prepared by transparentizing the same paper with a conventional solution of alpha-methylstyrene polymer in toluene. The latter exhibits substantial front curl after processing.

Example No. 2

A transparentizing solution is prepared as in Example No. 1, with the exception that the polyoxypropylene ether of sorbitol is replaced by an equal amount of polyoxypropylene ether of methylglucoside having an OH number of 440 and an average molecular weight of 470.

Proceeding otherwise identical to Example No. 1, a transparentized paper is obtained which for all practical purposes performs identical to the one obtained in Example No. 1.

A sample sheet from Example No. 2 is used as a copying sheet on a xerography machine. The paper is easily processed without softening or scorching, and a translucent copy is obtained which has the necessary qualities of a second original.

Example No. 3

A solution is prepared by mechanical mixing:

| | Parts |
|---|---|
| Polyoxypropylene ether of sorbitol with an OH number of 525 and an average molecular weight of 675 | 300 |
| Polyoxypropylene ether of glycerine with an OH number of 58 and an average molecular weight of 2990 | 300 |
| Hexamethyl-methylol melamine | 200 |
| Water | 800 |
| p-Toluene sulfonic acid | 15 |

On a paper coating machine, the above solution is applied in a vertical size press to a no-rag paper with a basis weight of 55 g./m.$^2$ which has internal wet-strength sizing and a surface sizing of starch and Scripset 520 (a polyelectrolyte resin from Monsanto). The treated paper is wound without drying and kept for four hours. Thereafter, it is dried at 250° F. and calendered.

The paper basis weight increased to 65 g./m.$^2$. The translucency of the paper is uniform to visible light and to ultraviolet light of a mercury lamp and is substantially equivalent to the paper obtained in Example No. 1.

Example No. 4

A solution is prepared by mechanical mixing:

| | Parts |
|---|---|
| Polyoxypropylene ether of pentaerythritol with an OH number 450 and an average molecular weight of 500 | 300 |
| Polyoxypropylene ether of a polyol containing phosphorous and having an OH number of 280, as sold under the name of Pluracol 208 by Wyandotte Chemical Corporation | 300 |
| Hexamethyl-methylol melamine | 250 |
| Water | 800 |
| p-Toluene sulfonic acid | 15 |

On a paper impregnating machine, a calendered 100% rag base paper of 55 g./m.$^2$ substance weight with a rosin internal sizing and a surface sizing of starch and gelatin is dipped into the above solution; and the excess is removed by passing the impregnated web between two mechanical scraper bars. The paper is then wound up without drying and kept overnight. The next day the paper is passed through a dryer and exposed to 250° F. for 45 seconds. Its substance weight is found to increase to 66 g./m.$^2$.

The paper is evenly translucent and gained 80% reprint translucency when tested in a diazotype printing machine.

The paper has an excellent receptivity for soft and hard pencils and for India ink and lines are easily erased with a mechanical eraser.

While a paper prepared from the same base sheet but with a toluene solution of alpha-methylstyrene polymer for transparentizing is also well receptive for soft pencils, it breaks under the pressure of hard pencils and ghosts upon erasure.

The paper of Example No. 4 is sensitized on a diazotype coating machine with the following solution:

| | Parts |
|---|---|
| Water | 1000 |
| Citric acid | 40 |
| Colloidal silica | 20 |
| 1-diazo-4-dimethylamino benzene chloride, ½ zinc chloride | 40 |
| Coupler RX (trade name of Andrews Paper & Chemical Company for beta-resorcylic acid-ethanolamide) | 50 |
| Diethylene glycol | 20 |
| Zinc chloride | 40 |
| Polyvinylacetate, 50% dispersion in water | 80 | and dried to a residual moisture of 3–5%. The thus obtained intermediate diazotype paper is exposed behind an orginal tracing in a diazotype printing machine and developed with ammonia vapors.

Deep brown print lines on a clear evenly translucent background are obtained and the print performs very well as a second original. Its reprint speed to produce opaque diazotype copies exceeds by 25% the reprint speed of a conventionally prepared diazotype intermediate, which is sensitized with the same diazotype coating solution but transparentized with a toluene solution of alpha-methylstyrene polymer.

When exposed side by side to ultraviolet light for an extended period of time, the print from No. 4 shows much less discoloration than the print for which the alpha-methylstyrene polymer transparentized paper was used as the base.

Example No. 5

A solution is prepared by mechanical mixing:

| | Parts |
|---|---|
| Polyoxypropylene of a polyol containing phosphorous and having an OH number of 280 sold under the name of Pluracol 208 by Wyandotte Chemical Corporation | 600 |
| Hexamethyl-methylol melamine | 300 |
| Ethanol | 400 |
| Water | 400 |
| Catalyst 1010 (American Cyanamid Co.) | 15 |

On a paper impregnating machine, a calendered cotton linters paper of 45 g./m.² basis weight with a wet-strength internal sizing and a surface sizing of Scripset 520 (paper coating resin of Monsanto) is dipped into the above solution and the excess is removed by a pair of squeeze rollers. The paper passes immediately thereafter through a hot air convection dryer and is exposed to 350° F. for 30 seconds and then rewound.

The obtained sheet is highly translucent and is well receptive to soft and hard pencils as well as to India ink and erases easily.

When lit with a match, the paper does not sustain the flame but slowly extinguishes.

The same base paper when transparentized with a toluene solution of alpha-methylstyrene polymer or a butene polymer resin and after drying to remove the solvent, readily burns when lit with a match and does not extinguish before being completely consumed.

Example No. 6

A solution is prepared by mechanical mixing:

| | Parts |
|---|---|
| Polyoxypropylene ether of sorbitol having an OH number of 525 and an average molecular weight of 675 | 400 |
| A branched polyalcohol with ether and ester groups having an OH number of 165 as sold under the name of Desmophen 1150 by Farbenfabriken Bayer AG | 200 |
| Hexamethyl-methylol melamine | 250 |
| Ethanol | 600 |
| Water | 200 |
| p-Toluene sulfonic acid | 15 |

A base paper of the same type as used in Example No. 1 is treated with the above solution and in the same manner as in Example No. 1. A transparentized paper is obtained with characteristics for all practical purposes identical to the paper obtained in Example No. 1.

Example No. 7

A solution is prepared by mechanical mixing:

| | Parts |
|---|---|
| Polyoxypropylene ether of methylglucoside having an OH number of 440 and an average molecular weight of 470 | 400 |
| A linear polyol-polyester with an OH number of 56 as sold under the name of Desmophen 1900 U by Farbenfabriken Bayer AG | 200 |
| Hexamethyl-methylol melamine | 200 |
| Ethanol | 800 |
| p-Toluene sulfonic acid | 15 |

On a paper impregnating machine, the above solution is applied to the same base paper as in Example No. 4 and in an identical manner, with the exception that after transparentizing and overnight wet packing, the paper is dried and exposed to a temperature of 350° F. for 45 seconds.

The further treatments of the paper are identical to Example No. 4 and with for all practical purposes identical results.

Example No. 8

A solution is prepared by mechanical mixing:

| | Parts |
|---|---|
| Polyoxy propylene ether of methyl glucoside having an OH number of 300 such as sold under the name of Cord Polyether MEG 300 by IPC International | 400 |
| Polyoxy propylene ether of a polyol containing phosphorous and having an OH number of 280 as sold under the name of Pluracol 208 by Wyandotte Chemical Corp. | 400 |
| Hexamethyl-methylol melamine | 600 |
| Ethanol | 550 |
| Water | 550 |
| p-Toluene sulfonic acid | 60 |
| Silica (1 micron particle size) | 60 |

On a size press a non-calendered 100% rag paper of 45 g./m.² basis weight with a wet strength internal sizing and a glue surface sizing is treated with the above solution and the paper is immediately wound thereafter without drying. After two hours, the paper is passed through cylinder dryers of a paper machine with a surface temperature of 240° F. and rewound. The paper is then calendered in a conventional paper calendering machine. It has a substance weight of 55 g./m.².

The paper has become evenly translucent and gained 70% reprint translucency when tested in a diazotype printing machine.

The paper has an excellent receptivity for soft and hard pencils and for India ink and lines are easily erased with a mechanical eraser.

The paper roll of Example No. 8 is then placed on a diazotype coating machine with three air knife coating stations and precoated on the first coating station with a preparation of:

| | Parts |
|---|---|
| Water | 1,000 |
| Silica (of a particle size of 1 micron) | 25 |
| Casein | 90 |
| Ammonia | 25 |
| Polyvinylacetate (50% aqueous dispersion) | 125 | and dried thereafter and then sensitized in the second coating station with a preparation of:

| | Parts |
|---|---|
| Water | 1,000 |
| Tartaric acid | 40 |
| Colloidal silica | 20 |
| 1-diazo-4-dimethyl amino benzene chloride 1/2 zinc chloride | 50 |
| Coupler RX (trade name of Andrews Paper & Chemical Company for beta-resorcylic acid-ethanol amide) | 50 |
| Diethylene glycol | 20 |
| Polyvinyl acetate (50% aqueous dispersion) | 80 |
| Zinc chloride | 30 | and dried thereafter and backcoated then with a solution of:

| | Parts |
|---|---|
| Water | 1,000 |
| Ethanol | 40 |
| Tartaric acid | 20 |
| Polyvinyl acetate (50% aqueous dispersion) | 40 | and dried to a residual moisture of 3.5%.

The thus obtained intermediate diazotype paper is exposed behind an original tracing in a diazotype printing machine and developed with ammonia vapors.

Deep brown print lines on a clear evenly translucent background are obtained and the print performs very well as a second original. Its reprint speed to produce opaque diazotype copies exceeds by 20% the reprint speed of a conventionally prepared diazotype intermediate, which is sensitized with the same diazotype coating preparation but transparentized with a toluene solution of alpha-methyl styrene polymer.

The print background excels by its stability against discoloration under UV light when compared with the print transparentized with the toluene solution of alpha-methyl styrene polymer.

It should be understood that modifications may be made in any of the foregoing examples within the scope of the present disclosure. Thus, in each of the foregoing examples any of the other indicated polyols and any of the other indicated methylol derivatives of polyamine compounds and any of the other catalysts may be substituted for those specifically listed in the examples. In addition, the proportions may be varied within the indicated limits.

I claim:
1. A method for transparentizing a paper web which comprises:
(a) providing a liquid transparentizing composition of a polyol selected from the class consisting of liquid polyoxyethylene and polyoxypropylene ethers of polyhydric alcohols having a number of polyoxy groups between 2 to 70, polyoxyethylene and polyoxypropylene ethers of branched ester polyols, polyoxyethylene and polyoxypropylene ethers of phosphorous esters of polyol and an alcohol soluble methylol melamine material and an acid catalyst, the ratio of hydroxyl groups of the polyol to the methylol or alkylated methylol groups of the polyamines being from 3:2 and 3:8 respectively;
(b) impregnating said paper web with said transparentizing composition to provide a transparentizing effect to said paper web; and
(c) resinating said impregnated transparentizing compositions in said paper web by polycondensation reaction *in situ*.

2. The method for transparentizing a paper web according to claim 1 wherein the poly N-methylol derivative is an alkylated poly methylol derivative of melamine.

3. The method for transparentizing a paper web according to claim 1 wherein the polyol derivative is polyoxypropylene ether of methylglucoside having the general formula:

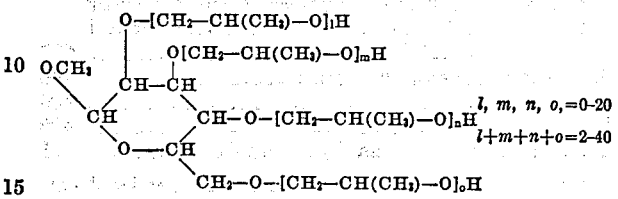

4. The product made by the method of claim 1.

References Cited
UNITED STATES PATENTS

| | | | |
|---|---|---|---|
| Re. 24,011 | 5/1955 | Ericks | 117—155 X |
| 2,535,380 | 12/1950 | Adams et al. | 260—849 X |
| 2,722,523 | 11/1955 | Gilchrist et al. | 260—70 X |
| 3,083,118 | 3/1963 | Bridgeford | 117—62.1 X |
| 3,194,720 | 7/1965 | Grudus et al. | 161—156 |
| 3,194,721 | 7/1965 | Grudus et al. | 161—156 |
| 3,310,416 | 3/1967 | Schibler | 260—67.6 X |
| 3,422,046 | 1/1969 | Thomas et al. | 260—67.6 X |
| 3,493,417 | 2/1970 | Moren et al. | 260—17.3 X |

WILLIAM D. MARTIN, Primary Examiner
M. R. LUSIGNAN, Assistant Examiner

U.S. Cl. X.R.
8—119; 96—75; 117—34, 68, 76 P, 155 L, 155 R